May 4, 1965    K. R. LOHBAUER ET AL    3,181,667
SYSTEM FOR AUTOMATICALLY NEUTRALIZING A VEHICLE
TRANSMISSION UPON APPLICATION OF BRAKES
Filed Feb. 25, 1963        2 Sheets-Sheet 2
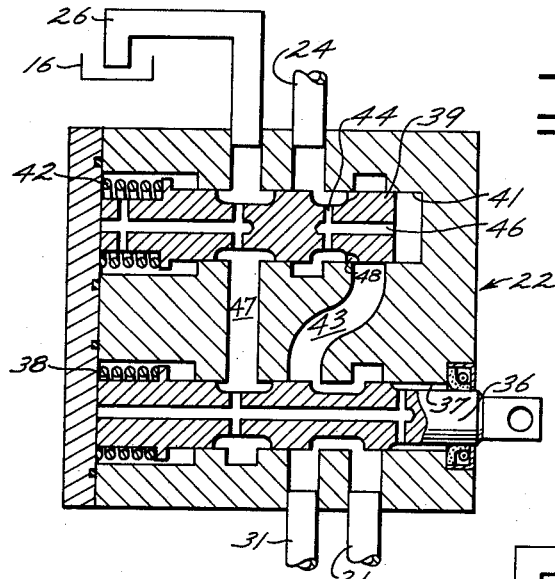
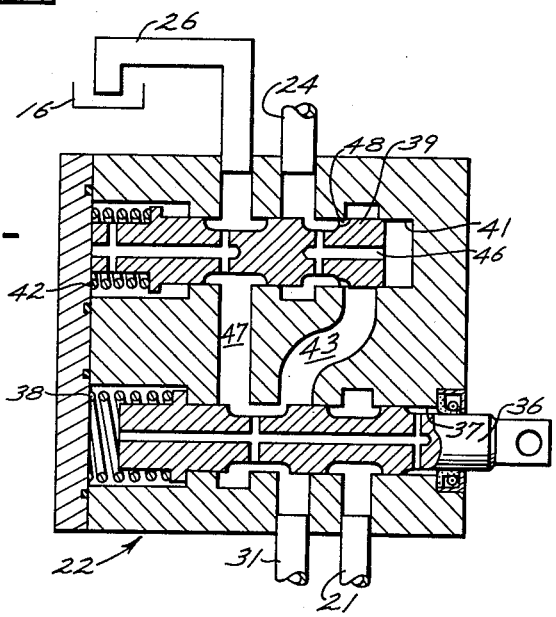
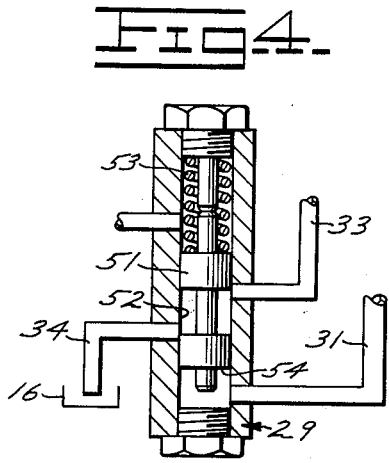
INVENTORS
KENNETH R. LOHBAUER
JIMMY D. MYERS
BY   FRANK H. WINTERS
ATTORNEYS United States Patent Office 3,181,667
Patented May 4, 1965

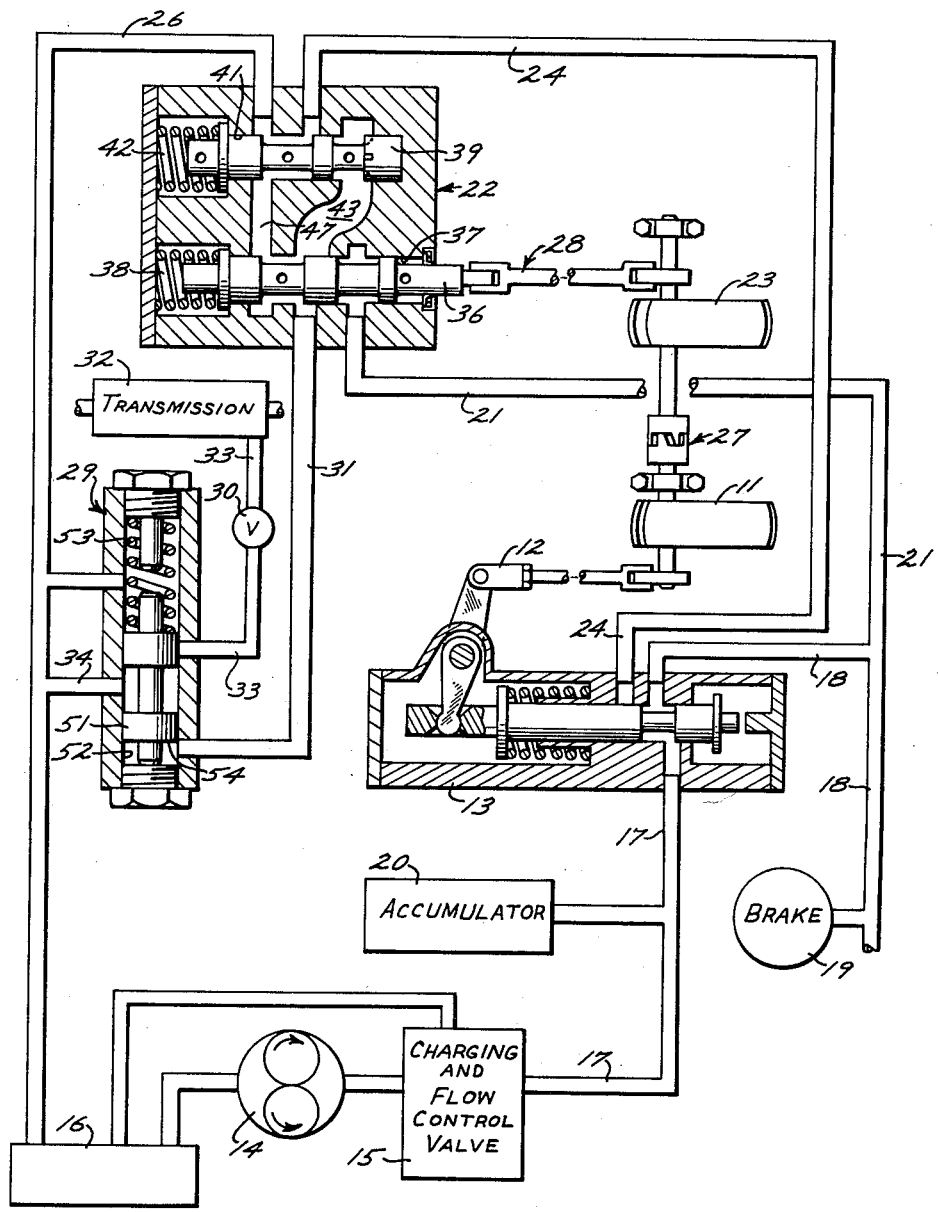

3,181,667
SYSTEM FOR AUTOMATICALLY NEUTRALIZING A VEHICLE TRANSMISSION UPON APPLICATION OF BRAKES
Kenneth R. Lohbauer, Joliet, Jimmy D. Myers, Morton, and Frank H. Winters, Joliet, Ill., assignors to Caterpillar Tractor Co., Peoria, Ill., a corporation of California
Filed Feb. 25, 1963, Ser. No. 260,487
4 Claims. (Cl. 192—4)

This invention relates to means employed on a vehicle for effecting automatic disengagement of the transmission or main clutch when desired upon application of the vehicle brakes as well as re-engagement of the transmission when the brakes are released.

The invention is particularly applicable to loaders of the type in which an engine employed to power the vehicle for movement from place to place is also employed to provide power, often through hydraulic pumps, to raise and manipulate a bucket, fork or other material handling device carried by the vehicle. It has been recognized as desirable to employ a connection between the brake pedal of a loader and its transmission to neutralize the transmission automatically upon actuation of the brakes. This has the advantage of freeing the hands of the operator to manipulate the bucket controls, instead of actuating a transmission or clutch lever first, and also insures availability of full power of the engine for manipulating the bucket without delay. A disadvantage of existing devices designed for this purpose is that a brief period occurs in which the clutch or transmission is disengaged after the brakes are released. This results in difficulty in properly positioning the device and in a dangerous situation, particularly during operation on a slope, because the vehicle is momentarily able to coast.

In order to overcome the above mentioned disadvantages, systems have been designed which employ delay means for the purpose of insuring that the brakes are engaged prior to the transmission being neutralized and also insure that the transmission is fully engaged before the brakes are released upon disengagement of the brakes. While delaying the disengagement of the brake mechanisms after the brake actuating device (pedal) is released provides the desired safety against possible coasting, it has been observed that excessive brake wear occurs in such systems. The excessive brake wear is due primarily to the fact that the delay means allows the transmission to be engaged and power delivered to drive the machine while the brakes are still engaged, thus causing the brakes to operate against the full power of the machine each time they are disengaged. Systems as presently known in the art employ brake delay means in a manner which causes the excessive wear problem mentioned above to occur not only when the vehicle brake system is employed in conjunction with the transmission neutralizer system, but also when the brake system is used in its conventional manner.

Accordingly, it is an object of the present invention to reduce the amount of brake wear which accompanies brake systems equipped with transmission neutralizer means, without losing the benefits of such neutralizer means.

Another object of the present invention is to enable "inching" and similar vehicle operation to be performed by a vehicle having a transmission neutralizer as part of the brake system.

Further and more specific objects and advantages of the invention will be made apparent from the following specification wherein a preferred form of the invention is described by reference to the accompanying drawings.

In the drawings:

FIG. 1 is a schematic illustration of a brake system employing a neutralizer in combination with the vehicle transmission and without the neutralizer system being activated;

FIG. 2 is a cross section of a neutralizer valve with the several components thereof shown in the positions they assume when the transmission is being neutralized;

FIG. 3 is a cross section of the neutralizer valve of FIG. 2 with the components shown in the positions they assume immediately after release of the neutralizer brake pedal; and FIG. 4 is a cross section of a transmission dump valve employed to vent working fluid from the transmission engaging means when the neutralizer valve is actuated.

Referring now to FIG. 1, a right brake pedal 11 is mechanically connected through linkage 12 to a brake valve 13. Brake valve 13 is supplied with working fluid from a pump 14 which draws fluid from a tank 16 and delivers it to brake valve 13 through a conduit 17. When brake pedal 11 is actuated, brake valve 13 is conditioned to supply pressurized working fluid to a conduit 18 which leads to the vehicle brakes 19 (only one of which is illustrated). As is also shown, a charging and flow control valve 15 and associated accumulator 20 are generally interposed between pump 14 and brake valve 13 for controlling and maintaining an acceptable pressure level in the circuit. A branch conduit 21 off of conduit 18 provides a source of working fluid to a neutralizer valve 22 for the purpose to be described below. At this point it should be noted, however, that the neutralizer valve is so conditioned when a left brake pedal 23 is not actuated as to prevent the working fluid in conduit 21 from passing through the valve 22. Thus, normal braking is achieved by use of pedal 11, which when depressed or actuated provides working fluid to the brakes 19.

When the pedal 11 is released, the communication between the source of working fluid in conduit 17 and conduit 18 is discontinued and communication is established by valve 13 between conduit 18 and a conduit 24. Conduit 24 leads from brake valve 13 to neutralizer valve 22 and communicates through the neutralizer valve to a conduit 26 which leads to tank 16. Communication exists between conduit 24 and conduit 26 through neutralizer valve 22 when pedal 23 is not actuated, such that release of pedal 11 from its actuated position results in the discharge of working fluid from brake 19 through conduit 18, brake valve 13, conduit 24, neutralizer valve 22, and conduit 26 to tank 16. It is to be especially noted that in the discharge path between the brake and the tank 16 there are no delaying mechanisms which operate to prevent the immediate release of the brakes 19 upon release of pedal 11.

Brake pedal 23 is interrelated through a cross shaft arrangement shown generally at 27 to brake pedal 11, such that actuation of brake pedal 23 results in the actuation of brake pedal 11 as well. Thus, when the left brake pedal 23 is depressed the brake system will operate as described above with accompanying modifications due to a change in the condition of neutralizer valve 22. Depression of pedal 23 changes the condition of neutralizer valve 22 through interconnecting mechanism 28 such that the pressurized working fluid in conduit 21 is able to pass through the neutralizer valve to a transmission vent valve 29 which communicates with valve 22 through a conduit 31. Transmission vent valve 29 is in communication with a transmission control valve 30 and an associated transmission 32 through a conduit 33, and is also in communication with tank 16 through a conduit 34. The presence of pressurized fluid in conduit 31 causes vent valve 29 to communicate conduit 33 with conduit 34 such that the fluid actuated devices which cause the transmission 32 to be engaged are communicated with tank 16 and thereby disengaged neutralizing the transmission. Thus, the effect of actuating brake pedal 23 is the combination of engaging brakes 19 and neutralizing the transmission 32.

Upon disengagement of brake 23 conduit 31 is communicated with conduit 26 such that the pressure in conduit 31 quickly drops such that transmission vent valve 29 shifts back to its unactivated position and blocks communication between conduits 33 and 34. This enables the transmission engaging means to be activated through a normal modulating cycle and thereby return the transmission to a driving condition. The disengagement of brakes 19 takes place by virtue of conduit 18 being communicated with tank 16 through neutralizer valve 22. Neutralizer valve 22 is of such construction (to be described in detail below) as to delay the communication between conduit 24 and conduit 26 such that the brakes are not disengaged until sufficient time has passed to insure that transmission 32 has been engaged. Once this condition is established the communication between conduits 24 and 26 is quickly provided so that the brakes can be disengaged with a minimum of operation in which the vehicle is working against the engaged brakes.

Thus, by virtue of the present invention as described above the operator of a vehicle equipped with the present invention has the choice of employing the brake system in conjunction with the neutralizer system giving rise to a delayed brake release, or the straight brake system not including a delayed brake release and thereby enabling the operator to employ the brake in "inching" and other similar vehicle operations.

Referring now to FIG. 1, neutralizer valve 22 includes a valve spool 36 slidably disposed in a bore 37 and urged rightwardly (as shown) by a biasing spring 38. Valve 22 further includes a valve spool 39 slidably disposed in a valve bore 41 and urged rightwardly (as shown) by a biasing spring 42. When the left brake pedal 23 is not actuated, valve spool 36 is in the position illustrated in FIG. 1 whereby conduit 21 which communicates with bore 37 is blocked from communication with either conduit 31 which also communicates with bore 37, or the other portions of valve 22. Spool 39 allows communication between conduits 24 and 26 through bore 41.

Referring now to FIG. 2, spool 36 is shown urged to its leftwardly most position in response to left brake 23 being depressed. In this position of spool 36 communication is established between conduits 21 and 31 through bore 37 while a passageway 43 which communicates between bore 37 and bore 41 carries pressure fluid from conduit 21 to spool 39 where it enters radial ports 44 and connecting longitudinal passage 46 in spool 39. The fluid pressure in passage 46 and ports 44 counteracts the force of spring 42 and urges spool 39 leftwardly. The leftward movement of spool 39 causes conduit 24 to be blocked from conduit 26 such that tank 16 no longer communicates with brake valve 13 directly. When the components of valve 22 are positioned as shown in FIG. 2 working fluid in conduit 21 passes freely to conduit 31 to maintain the valve 29 in its neutralizing condition.

When pedal 23 is released from its actuated position spool 36 reassumes the position shown in FIG. 3 whereby conduit 31 communicates with tank 16 through conduit 26 by virtue of the communication between bore 37 and bore 41 through a connecting passage 47. This accounts for the rapid pressure drop in conduit 31 so as to shift valve 29 to its non-activated position. The release of pedal 23 also causes pedal 11 to assume its non-activated position and thereby transmit the pressure in brakes 19 to conduit 24 (see FIG. 1). The existence of pressure fluid in conduit 24 prevents valve 39 from rapidly reassuming its rightward position and thus conduit 24 does not immediately communicate fully with conduit 26 so as to enable pressure in the brake system to be quickly reduced (see FIG. 3). While conduit 24 does not fully communicate with conduit 26 through bore 41 immediately upon release of pedal 23, there is communication between conduit 24 and conduit 26 through throttling slots 48 in spool 39, passage 43, bore 37, passage 47, and bore 41. Upon the initial release of the pedal 23 the throttling slots 48 provide a small area by which fluid in conduit 24 can pass into passage 43. As fluid passes through throttling slots 48 to passage 43, the pressure in conduit 24 decreases enabling the spool 39 to gradually move rightwardly and thereby increase the area of communication provided through throttling slots 48. This increase in area further enables a decrease in pressure in conduit 24 with a further increase in area such that after an initial delay the spring 42 is able to quickly shift spool 39 rightwardly whereby the conduit 24 is fully communicated with conduit 26 directly through bore 41. By the advantageous employment of throttling slots 48 the delay which spool 39 provides in reducing the pressure in brakes 19 is sufficient to enable the transmission to be fully engaged, with a minimum of wear on the vehicle brakes.

Referring now to FIG. 1, transmission vent valve 29 includes a valve spool 51 slidably disposed in a bore 52 and urged in a downward position (as shown) by means of a biasing spring 53. Conduit 31 communicates with the end of bore 52 opposite to that containing spring 53 such that pressure fluid in conduit 31 acts against the end 54 of spool 51 so as to provide a counteracting force to spring 53 and urge the spool upwardly. When spool 51 is urged to its upward position by the presence of pressure fluid in conduit 31, conduit 33 leading to the transmission 32 is communicated through bore 52 with conduit 34 which leads to low pressure tank 16. Thus, in the position of FIG. 4 the vent valve allows the pressure in the transmission actuating mechanism to be decreased whereby the transmission is neutralized. When the pressure in conduit 31 is decreased, spool 51 moves to its downward position blocking conduit 33 from conduit 34 enabling pressure to build up in the transmission to re-establish a driving condition thereof. It is to be noted that by employment of a separate vent valve the present system is readily adaptable for use with the more complicated transmission systems without requiring major redesigning.

We claim:

1. In a system for a vehicle having brakes and a transmission the combination comprising;
a first brake pedal;
first means mechanically associated with said first brake pedal and responsive to actuation thereof to engage the vehicle brakes, said means responsive to said pedal being released from an actuated condition to release the vehicle brakes without a delay;
a second brake pedal;
second means mechanically associated with said second brake pedal and responsive to actuation thereof to engage the vehicle brakes and neutralize the vehicle transmission, said second means responsive to release of said second pedal from an actuated condition to re-establish the transmission to a driving condition and disengage the brakes, said second means operable to delay the disengagement of the brakes until the transmission is in a driving condition.

2. In a hydraulic system for a vehicle having brakes and a transmission the combination comprising;
a first brake pedal;
first means mechanically associated with said brake pedal and responsive to actuation thereof to direct working fluid to the brakes for engagement thereof, said means responsive to release of said pedal from an actuated condition to communicate the brakes with a sump and thereby disengage the brakes, said means operable to disengage the brakes upon release of said pedal without a delay;
a second brake pedal;

means connecting said second brake pedal to said first brake pedal whereby actuation of the former results in actuation of the latter and release from actuation of the former releases the latter; and second means mechanically associated with said second brake pedal and responsive to actuation thereof to neutralize the transmission, said second means responsive to release of said second pedal to re-establish the transmission to a driving condition and delay the disengagement of the brakes until the transmission is so conditioned.

3. In a system for a vehicle having brakes and a transmission the combination comprising;

a first brake pedal;

first means mechanically associated with said pedal and responsive to actuation thereof to direct hydraulic working fluid to the brakes;

a second brake pedal;

a neutralizer valve means mechanically associated with said second brake pedal;

means communicating said first means with said valve means whereby actuation of said first pedal results in hydraulic working fluid being delivered to said valve means;

vent valve means associated with the transmission and responsive to hydraulic pressure to neutralize the transmission;

means communicating said vent valve means to said neutralizer means;

said neutralizer valve means having a condition corresponding to said second pedal not being actuated wherein the means communicating the first means to the neutralizer valve means is blocked from said means communicating the neutralizer valve means to the vent valve means, said neutralizer valve means having a condition corresponding to said second pedal being actuated wherein communication exists between said vent valve means and said first means through said neutralizer valve means;

mechanical means connecting said first pedal to said second pedal such that actuation of the latter results in actuation of the former and release of the latter results in release of the former;

means communicating the brakes to a sump, said means responsive to release of said first pedal from its actuated position, when it alone has been actuated, to fully communicate the brakes to the source without a delay, and said means responsive to release of said second pedal from an actuated condition to delay full communication between the brakes and the source.

4. In a vehicle brake system the combination comprising;

a first brake pedal;

a second brake pedal;

means connecting said pedals such that said first pedal is operable independent of said second pedal while operation of said second pedal results in operation of said first pedal as well;

valve means associated with said first brake pedal and responsive to actuation thereof to direct pressure fluid to the brakes; and valve means associated with both said first and said second pedals, said means responsive to release of said first brake pedal from an actuated position, when that pedal alone has been actuated, to communicate the brakes with a sump without a delay, said valve means responsive to release of said second pedal from an actuated position to communicate the brakes with the sump after a set delay.

References Cited by the Examiner

UNITED STATES PATENTS 2,032,504   3/36   Schweering _____ 192—13
3,017,974   1/62   Lasley.
3,050,165   8/62   Day et al.

DAVID J. WILLIAMOWSKY, *Primary Examiner.*